(12) United States Patent
Pratt et al.

(10) Patent No.: US 12,504,593 B2
(45) Date of Patent: Dec. 23, 2025

(54) OLTs WITH MESHED INTERCONNECTION

(71) Applicant: ARRIS Enterprises LLC, Suwanee, GA (US)

(72) Inventors: Bruce C. Pratt, Bedford, NH (US); Shawn W. Warner, Pepperell, MA (US); David Bowler, Stow, MA (US); Theodore A. Colarusso, Madbury, NH (US)

(73) Assignee: ARRIS Enterprises LLC, Horsham, PA (US)

( * ) Notice: Subject to any disclaimer, the term of this patent is extended or adjusted under 35 U.S.C. 154(b) by 288 days.

(21) Appl. No.: 18/201,040

(22) Filed: May 23, 2023

(65) Prior Publication Data

US 2024/0053556 A1 Feb. 15, 2024

Related U.S. Application Data

(60) Provisional application No. 63/396,567, filed on Aug. 9, 2022.

(51) Int. Cl.
G02B 6/43 (2006.01)
G02B 6/38 (2006.01)
H04J 14/02 (2006.01)
H05K 1/02 (2006.01)

(52) U.S. Cl.
CPC ............ *G02B 6/43* (2013.01); *G02B 6/3897* (2013.01); *H04J 14/0282* (2013.01); *H05K 1/0274* (2013.01)

(58) Field of Classification Search
CPC ............................. G02B 6/43; H04J 14/0282
See application file for complete search history.

(56) References Cited

FOREIGN PATENT DOCUMENTS

EP 2830261 A1 1/2015
EP 3896870 A1 * 10/2021 ....... H04B 10/25891

OTHER PUBLICATIONS

International Search Report and Written Opinion RE: Application No. PCT/US2023/023266, dated Sep. 18, 2023.
Das Suarav: "From CORD to SDN Enabled Broadband Access (SEBA) [Invited Tutorial]", Journal of Optical Communications and Networking, IEEE, USA, col. 13, No. 1, Jan. 1, 2021, XP011824500, ISSN 1943-0620, DOI 10.1364/JOCN.402153 [retrieved on Dec. 4, 2020] 3. System Components; A. Voltha; 1. Voltha Core and Northbound Interfaces; Figures 3, 5, and 6.

* cited by examiner

*Primary Examiner* — Sung H Pak
(74) *Attorney, Agent, or Firm* — Chernoff, Vilhauer, McClung & Stenzel, LLP

(57) ABSTRACT

A system with OLTs having a meshed interconnection.

5 Claims, 5 Drawing Sheets

OLTs WITH MESHED INTERCONNECTION

CROSS REFERENCE TO RELATED APPLICATIONS

The present invention claims the benefit of U.S. Provisional Patent Application Ser. No. 63/396,567 filed Aug. 9, 2022.

BACKGROUND

The subject matter of this application relates to OLTs having a meshed interconnection.

A passive optical network (PON) is often employed as an access network, or a portion of a larger communication network. The communication network typically has a high-capacity core portion where data or other information associated with telephone calls, digital television, and Internet communications is carried substantial distances. The core portion may have the capability to interact with other networks to complete the transmission of telephone calls, digital television, and Internet communications. In this manner, the core portion in combination with the passive optical network enables communications to and communications from subscribers (or otherwise devices associated with a subscriber, customer, business, or otherwise).

The access network of the communication network extends from the core portion of the network to individual subscribers, such as those associated with a particular residence location (e.g., business location). The access network may be wireless access, such as a cellular network, or a fixed access, such as a passive optical network or a cable network.

Referring to FIG. 1, in a PON 10, a set of optical fibers and passive interconnecting devices are used for most or all of the communications through the extent of the access network. A set of one or more optical network terminals (ONTs) 11 are devices that are typically positioned at a subscriber's residence location (e.g., or business location). The term "ONT" includes what is also referred to as an optical network unit (ONU). There may be any number of ONTs associated with a single optical splitter 12. By way of example, 32 or 64 ONTs are often associated with the single network optical splitter 12. The optical splitter 12 is interconnected with the respective ONTs 11 by a respective optical fiber 13, or otherwise a respective fiber within an optical fiber cable. Selected ONTs may be removed and/or added to the access network associated with the optical splitter 12, as desired. There may be multiple optical splitters 12 that are arranged in a cascaded arrangement.

The optical fibers 13 interconnecting the optical splitter 12 and the ONTs 11 act as access (or "drop") fibers. The optical splitter 12 is typically located in a street cabinet or other structure where one or more optical splitters 12 are located, each of which are serving their respective set of ONTs. In some cases, an ONT may service a plurality of subscribers, such as those within a multiple dwelling unit (e.g., apartment building). In this manner, the PON may be considered a point to multipoint topology in which a single optical fiber serves multiple endpoints by using passive fiber optic splitters to divide the fiber bandwidth among the endpoints.

An optical line terminal (OLT) 14 is located at the central office where it interfaces directly or indirectly with a core network 15. An interface 16 between the OLT 14 and the core network 15 may be one or more optical fibers, or any other type of communication medium. The OLT 14 forms optical signals for transmission downstream to the ONTs 11 through a feeder optical fiber 17, and receives optical signals from the ONTs 11 through the feeder optical fiber 17. The optical splitter 12 is typically a passive device that distributes the signal received from the OLT 14 to the ONTs 11. Similarly, the optical splitter 12 receives optical signals from the ONTs 11 and provides the optical signals though the feeder optical fiber 17 to the OLT 14. In this manner, the PON includes an OLT with a plurality of ONTs, which reduces the amount of fiber necessary as compared with a point-to-point architecture.

As it may be observed, an optical signal is provided to the feeder fiber 17 that includes all of the data for the ONTs 11. Accordingly, all the data being provided to each of the ONTs is provided to all the ONTs through the optical splitter 12. Each of the ONTs selects the portions of the received optical signals that are intended for that particular ONT and passes the data along to the subscriber, while discarding the remaining data. Typically, the data to the ONTs are broadcast to the feeder fiber 17 and provided to each of the ONTs.

Upstream transmissions from the ONTs 11 through the respective optical fibers 13 are typically transmitted in bursts according to a schedule provided to each ONT by the OLT. In this way, each of the ONTs 11 will transmit upstream optical data at different times. In some embodiments, the upstream and downstream transmissions are transmitted using different wavelengths of light so that they do not interfere with one another. In this manner, the PON may take advantage of wavelength-division multiplexing, using one wavelength for downstream traffic and another wavelength for upstream traffic on a single mode fiber.

The schedule from the OLT allocates upstream bandwidth to the ONTs. Since the optical distribution network is shared, the ONT upstream transmission would likely collide if they were transmitted at random times. The ONTs typically lie at varying distances from the OLT and/or the optical splitter, resulting in a different transmission delay from each ONT. The OLT measures the delay and sets a register in each ONT to equalize its delay with respect to the other ONTs associated with the OLT. Once the delays have been accounted for, the OLT transmits so-called grants in the form of grant maps to the individual ONTs. A grant map is a permission to use a defined interval of time for upstream transmission. The grant map is dynamically recalculated periodically, such as for each frame. The grant map allocates bandwidth to all the ONTs, such that each ONT receives timely bandwidth allocation for its service needs. Much of the data traffic, such as browsing websites, tends to have bursts and tends to be highly variable over time. By way of a dynamic bandwidth allocation (DBA) among the different ONTs, a PON can be oversubscribed for upstream traffic.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
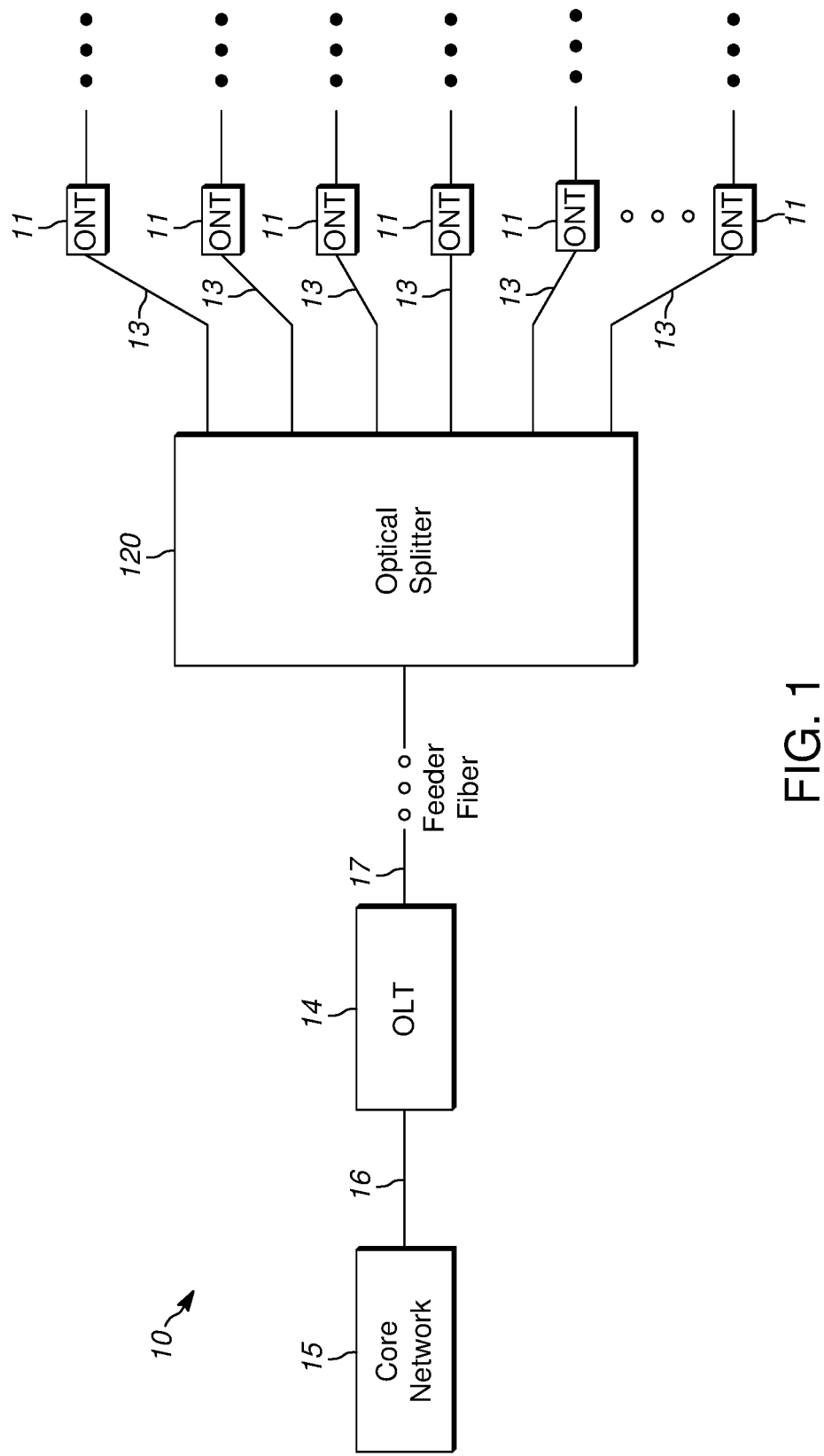
FIG. 1 illustrates a network that includes a passive optical network.
Figure 2:
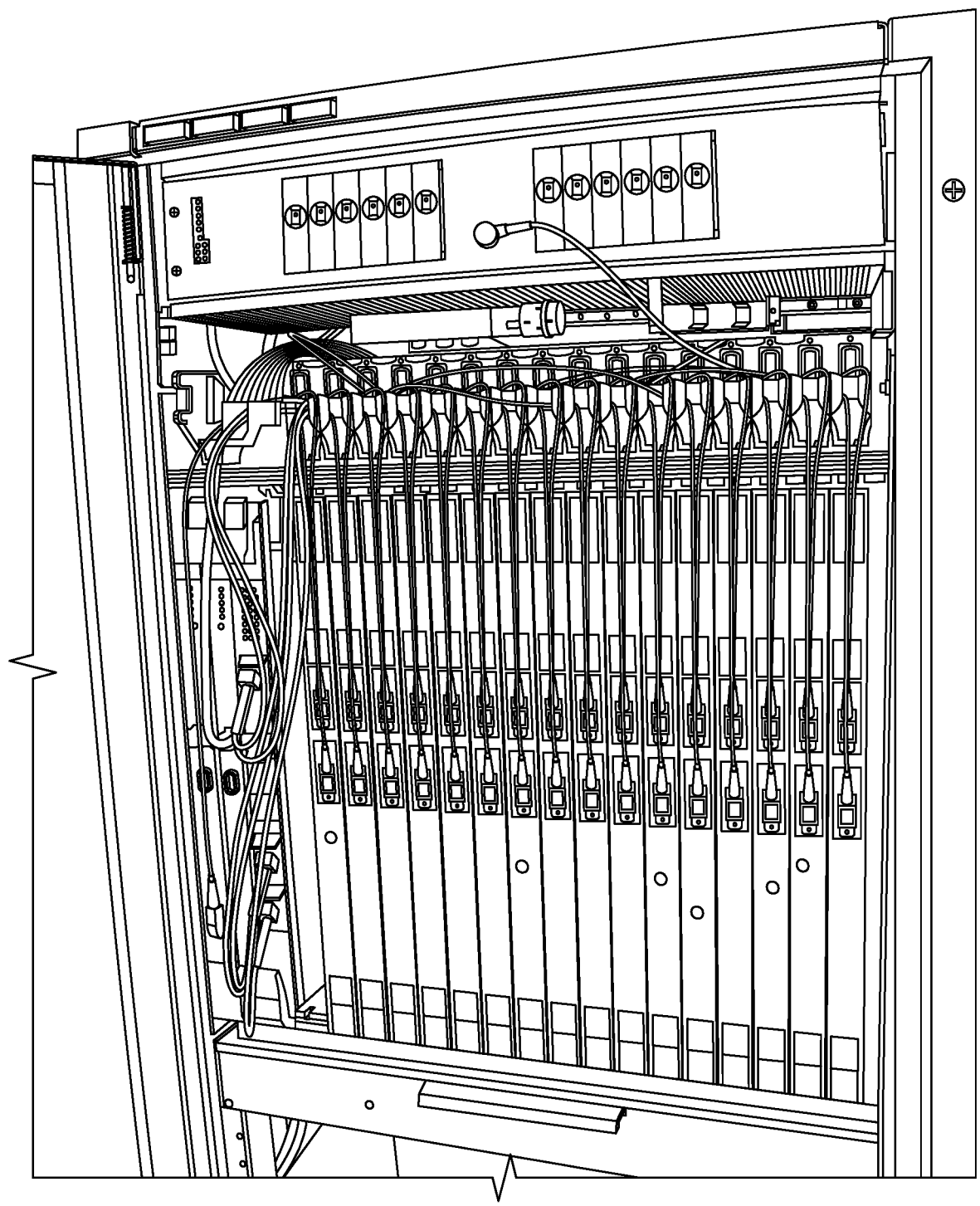
FIG. 2 illustrates a chassis-based OLT.

Referring to FIG. 2, an optical line terminal typically includes a plurality of vertical cards (i.e., blades), each of which includes a plurality of ports that provides interconnection to the PON access network, with each of the vertical cards being interconnected to a common backplane circuit board. The common backplane circuit board includes a series of traces thereon, along with various integrated circuits, that distribute signals to each of the vertical cards through an interconnection, such as a PCI slot. In this manner, the optical line terminal may be populated with a desired number of vertical cards while having a common backplane circuit board suitable to support additional vertical cards until the optical line terminal is fully populated. Further, the optical line terminal includes power management for each of the potential line cards that it may support. In this manner, the optical line terminal is designed for a capability to support a substantial number of ports, such as a minimum of 64 ports or more spread across the vertical cards. Unfortunately, such an OLT tends to be burdensome to install in a remote location from the core network, such as in a remote enclosure within the distribution network, due to limited power availability and limited space availability at the remote enclosure. Further, the backplane with interfaces for the vertical cards introduces a substantial number of complications related to signal integrity and physical robustness over time as the interfaces tend to become corroded when used in a non-humidity non-temperature controlled environment with dust and debris.

Figure 3:
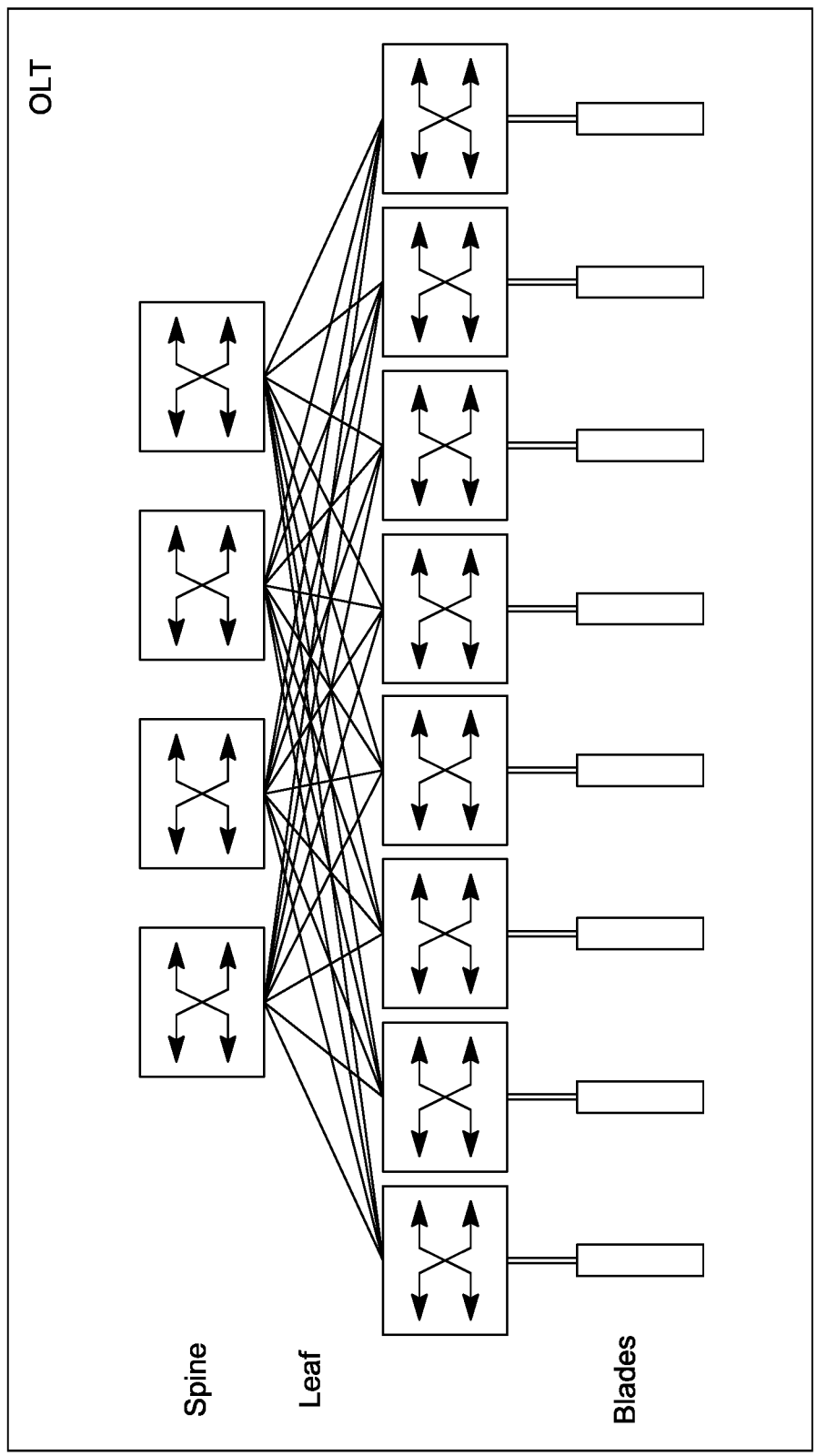
FIG. 3 illustrates a chassis-based OLT with a switch fabric.

Referring also to FIG. 3, the vertical cards that are detachably interconnected to the backplane are interconnected to one another through a leaf-spline switching fabric, all of which is enclosed and integrated within the housing for the OLT. The leaf-spline switching provides an integrated approach for distributing data. As the bandwidth requirements of the access network increase over time, the existing vertical cards are replaced with updated vertical cards that include increased capacity. However, the leaf-spline switching fabric often tends to be insufficient to support the bandwidth requirements of the updated vertical cards, thereby potentially necessitating the replacement of the entire OLT.

Figure 4:
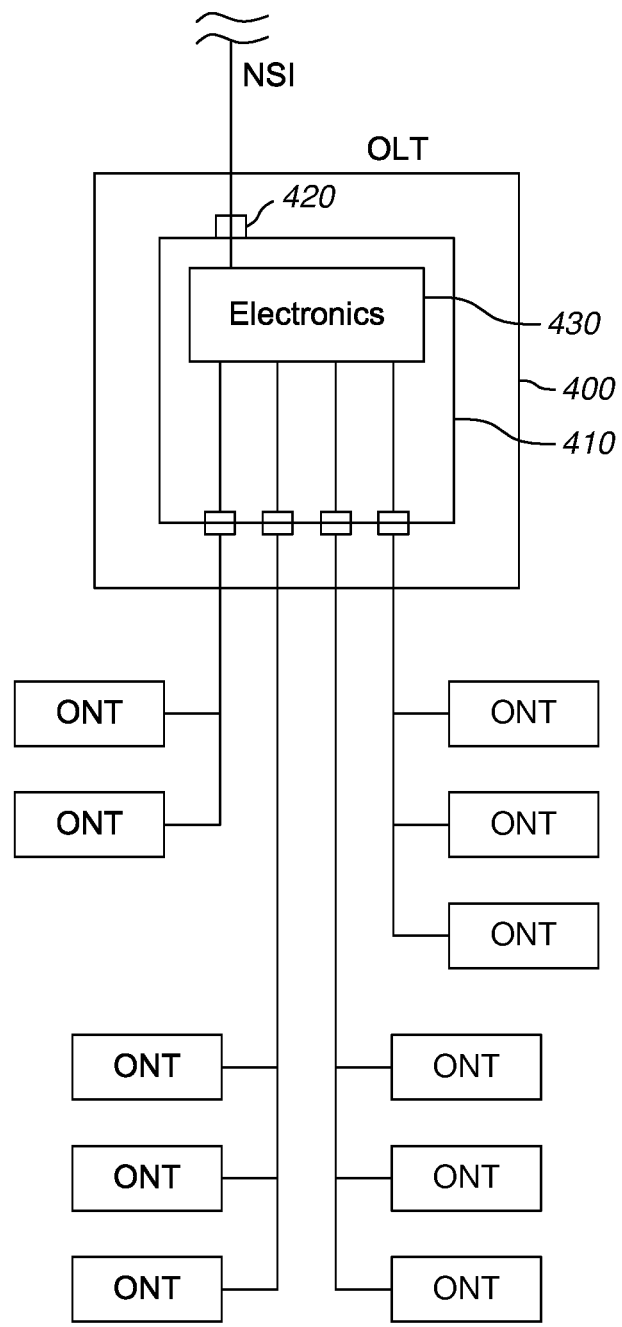
FIG. 4 illustrates a single backplane-based OLT.

Referring to FIG. 4, a modified approach to an OLT architecture is desirable for increased modularity, signal integrity and robustness. A modified OLT 400 includes a single backplane circuit board 410 that does not include any blades with PON ports that are detachably interconnected thereto. The circuit board 410 includes a network side interface (NSI) port 420 that interconnects to the core network, such as using an Ethernet based connection. The circuit board 410 includes electronics 430, such as a processor and optical components, thereon to send and receive data through the NSI port 420. The electronics 430 on the circuit board 410 further formats data for being transmitted on a PON network through a selected one of a plurality of PON ports 440 using PON transceivers (optical transmitters and optical receivers). The PON ports 440 are interconnected with respective ONTs using respective optical fibers using a PON based protocol.

As illustrated in FIG. 4, the OLT 400 does not include the extensive switch fabric of a leaf-spline switching fabric, and other than managing the switching between the ports 440 of the circuit board 410 which may be performed by a FPGA, and the data transmission through the NSI port 420. There may be multiple NSI ports, if desired. There may be fewer or greater number of PON ports, as desired. The OLT 400 is designed for capability to support a limited number of PON ports, such as a maximum of 16 ports without supporting PON ports on any detachably engageable blades. With the limitations resulting from the single backplane circuit board 410, especially as it relates to scalability, it is further desirable to include the capability of interconnecting a plurality of OLTs 400 in parallel for selected sets of subscribers that need more than the data capability that a single OLT 400 is capable of providing.

Figure 5:
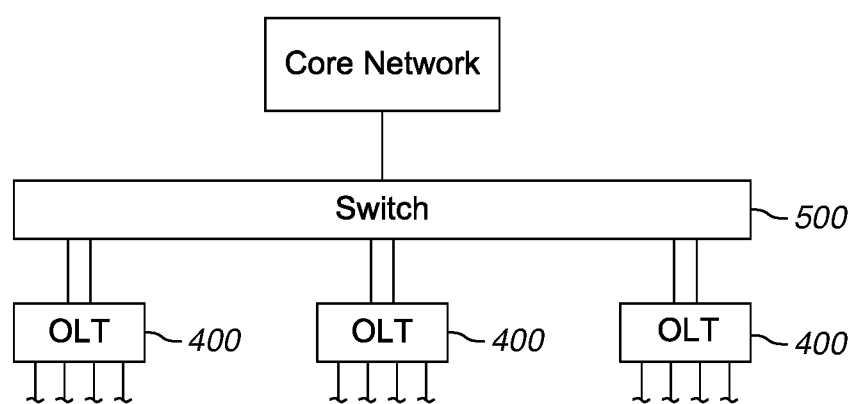
FIG. 5 illustrates a plurality of OLTs and a switch.

Referring to FIG. 5, a modified architecture includes a modular approach that includes a plurality of OLTs 400, each of which is based upon a single backplane circuit board 410. Each of the OLTs 400 is enclosed within its own housing and supports its own respective set of subscribers. Each of the OLTs 400 is interconnected with a switch 500, with one or more NSI ports which is in turn interconnected with the core network. The switch 500 is enclosed within its own housing. The switch 500 is interconnected with the respective OLTs by a respective set of one or more cables. With this modified architecture, the capabilities of supporting the PON access network may be expanded by increasing the number of OLTs 400 that are interconnected with the switch 500. With each OLT interconnected in parallel to the switch 500, the bandwidth carried by the switch 500 is correspondingly increased up to the limitations of the switch 500. Further, in the event that the bandwidth requirements of the OLTs 400 interconnected to the switch 500 exceeds the capabilities of the switch 500, the switch 500 may be replaced with an updated switch 500 with increased bandwidth capabilities. As it may be observed, the OLTs 400 do not need to be replaced to update the switch 500 capabilities.

The processing capabilities of each of the OLTs 400 may be relatively limited, often only having sufficient computational resources to provide the PON related processing for the transmission and receiving of PON data to and from the PON network, without significant additional computational resources in order to reduce the power requirements of the OLT and the heat dissipation that may otherwise occur as a result.

With such limited excess processing available with the OLT, it is desirable to virtualize some management features for the OLT to reduce the computational burden on the OLT. The virtualized management functionality may use computational resources on a server associated with the core network, which are readily scalable, as desired. The virtualized management functionality may be used to provision each of the OLTs. The virtualized management functionality may be used to re-provision each of the OLTs in when one or more subscribers are moved from one port to another port of the same OLT or a port of a different OLT. The virtualized management functionality may be used to detect alarm conditions of one or more of the OLTs, such as when one becomes unavailable or otherwise fails.

In some cases, such as for subscribers requiring high availability, there may be redundancy in the capability of transmitting data across the PON network to such subscribers requiring high availability. In the case that an OLT becomes unavailable or otherwise fails, the system may automatically failover to a backup OLT, to continue to provide PON data to the subscribers. The backup OLT may be interconnected to each of the fibers from the other ONTs, such as through an optical switch network. The virtualized management functionality may automatically redirect data traffic to the backup OLT.

Each of the OLTs may include a portion of the processing for the management of the OLTs operating thereon that provides balancing for the processing control traffic. When one or more of the OLTs fails, becomes unavailable, or otherwise does not have sufficient available computational resources available, the processing for the management of the OLTs operating thereon is redistributed among the remaining OLTs. Therefore, with the OLT management being distributed across the OLTs, and redistributed as necessary.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A network architecture comprising:
   (a) a first optical line terminal that includes a first single backplane circuit board that does not include any detachably engageable cards that include PON ports on said engageable cards;
   (b) said first single backplane circuit board including at least one first network side interface for receiving data from and providing data to a core network;
   (c) said first single backplane circuit board including a plurality of PON ports for receiving data from an optical PON network and providing data to said optical PON network, wherein said first single backplane circuit board includes no more than 16 said PON ports;
   (d) said first single backplane circuit board supporting a processor, at least one transmitter, and at least one optical sensor, configured to provide and receive data to said plurality of PON ports and configured to provide and receive data from said at least one network side interface;
   (e) said first single backplane, said processor, said at least one transmitter, and said at least one optical sensor all enclosed within a first OLT housing;
   (f) a server including a virtualized management service, where said virtualized management service selectively provisions said first optical line terminal for a first subscriber from a first one of said plurality of PON ports of said first optical line terminal to a second one of said plurality of PON ports of said first optical line terminal.

2. The network architecture of claim 1 further comprising a second optical line terminal that includes a second single backplane circuit board that does not include any detachably engageable cards that include PON ports on said engageable cards, said second single backplane circuit board including at least one second network side interface for receiving data from and providing data to said core network, said second single backplane circuit board including a plurality of PON ports for receiving data from an optical PON network and providing data to said optical PON network, wherein said second single backplane circuit board includes no more than 16 said PON ports, said second single backplane circuit board supporting a processor, at least one transmitter, and at least one optical sensor, configured to provide and receive data to said plurality of PON ports and configured to provide and receive data from said at least one network side interface, and said second single backplane, said processor, said at least one transmitter, and said at least one optical sensor all enclosed within a second OLT housing.

3. The network architecture of claim 2 further comprising
   (a) a switch enclosed within a switch housing, where said switch housing, said first OLT housing, and said second OLT housing are separate from one another;
   (b) said at least one first network side interface interconnected to at least one port of said switch with at least one cable;
   (c) said at least one second network side interface interconnected to at least one port of said switch with at least one cable;
   (d) said switch interconnected to said core network.

4. The network architecture of claim 1 further comprising a second optical line terminal that includes a second single backplane circuit board that does not include any detachably engageable cards that include PON ports on said engageable cards, said second single backplane circuit board including at least one second network side interface for receiving data from and providing data to said core network, said second single backplane circuit board including a plurality of PON ports for receiving data from an optical PON network and providing data to said optical PON network, wherein said second single backplane circuit board includes no more than 16 said PON ports, said second single backplane circuit board supporting a processor, at least one transmitter, and at least one optical sensor, configured to provide and receive data to said plurality of PON ports and configured to provide and receive data from said at least one network side interface, and said second single backplane, said processor, said at least one transmitter, and said at least one optical sensor all enclosed within a second OLT housing, where said first optical line terminal and said second optical line terminal support the same set of optical network terminals.

5. A network architecture comprising:
   (a) a first terminal that includes a first single backplane circuit board that does not include any detachably engageable cards that include network ports on said engageable cards;
   (b) said first single backplane circuit board including at least one first network side interface for receiving data from and providing data to a core network;
   (c) said first single backplane circuit board including a plurality of first network ports for receiving data from a data network and providing data to said data network, wherein said first single backplane circuit board includes no more than 16 said first network ports;

(d) said first single backplane circuit board supporting a first processor, at least one first transmitter, and at least one first optical sensor, configured to provide and receive data to said plurality of first network ports and configured to provide and receive data from said at least one first network side interface;

(e) said first single backplane, said first processor, said at least one first transmitter, and said at least one first optical sensor all enclosed within a first housing;

(f) a second terminal that includes a second single backplane circuit board that does not include any detachably engageable cards that include network ports on said engageable cards;

(g) said second single backplane circuit board including at least one second network side interface for receiving data from and providing data to said core network;

(h) said second single backplane circuit board including a plurality of second network ports for receiving data from said data network and providing data to said data network, wherein said second single backplane circuit board includes no more than 16 said second network ports;

(i) said second single backplane circuit board supporting a second processor, at least one second transmitter, and at least one second optical sensor, configured to provide and receive data to said plurality of second network ports and configured to provide and receive data from said at least one second network side interface;

(j) said second single backplane, said second processor, said at least one second transmitter, and said at least one second optical sensor all enclosed within a second housing;

(k) said first processor processing first management functions for said first terminal and said second processor processing second management functions for said second terminal;

(l) said first processor of said first terminal redistributing a portion of its processing of said first management functions to said second processor of said second terminal to process said portion of said first management functions on behalf of said first processor for said first terminal.

* * * * *